United States Patent
Holbrook et al.

(10) Patent No.: US 11,150,146 B1
(45) Date of Patent: Oct. 19, 2021

(54) DETERMINING COLD-CHAIN SHIPMENT PACKAGING

(71) Applicant: WALGREEN CO., Deerfield, IL (US)

(72) Inventors: Luke Holbrook, Pittsburgh, PA (US); Edwin Charles Musisko, Elizabethtown, PA (US); Daniel Shandel, Stahlstown, PA (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 16/748,052

(22) Filed: Jan. 21, 2020

Related U.S. Application Data

(63) Continuation of application No. 15/271,798, filed on Sep. 21, 2016, now Pat. No. 10,605,674.

(51) Int. Cl.
| | |
|---|---|
| G06Q 10/08 | (2012.01) |
| G01K 13/00 | (2021.01) |
| B65D 81/38 | (2006.01) |
| F25D 3/06 | (2006.01) |
| F25D 29/00 | (2006.01) |

(52) U.S. Cl.
CPC .......... *G01K 13/00* (2013.01); *B65D 81/38* (2013.01); *F25D 3/06* (2013.01); *F25D 29/003* (2013.01)

(58) Field of Classification Search
CPC .. B65D 81/18; B65D 83/265; B65D 2581/00; B65D 2581/3447
See application file for complete search history.

(56) References Cited

U.S. PATENT DOCUMENTS

| | | | |
|---|---|---|---|
| 6,397,163 B1* | 5/2002 | Hoyt | G06Q 10/08 206/559 |
| 8,600,903 B2 | 12/2013 | Eller | |
| 2004/0243353 A1 | 12/2004 | Aghassipour | |
| 2008/0291033 A1* | 11/2008 | Aghassipour | G06Q 10/08 340/584 |
| 2012/0197810 A1 | 8/2012 | Haarmann et al. | |
| 2016/0210576 A1 | 7/2016 | Weinstein et al. | |

* cited by examiner

*Primary Examiner* — Mohamed Charioui
*Assistant Examiner* — Christine Y Liao
(74) *Attorney, Agent, or Firm* — Marshall, Gerstein & Borun LLP; Randall G. Rueth

(57) ABSTRACT

Various techniques are described to compensate for weather and other extraneous temperature conditions along a transit route when preparing a product for cold-chain shipment packaging. The origin and destination of the shipment may be determined to calculate one or more transit routes, which may include each stage along each transit route. Weather data may be received from one or more sources to build a weather database for one or more locations, which may be used to generate a temperature profile indicating the expected temperature and duration at each stage of transit to which the cold-chain shipment will be exposed. Thermodynamic calculations may then be performed in accordance with the temperature profile to determine the best available packaging option to prevent the product's temperature from falling outside of a desired or mandatory cold-chain temperature range.

20 Claims, 7 Drawing Sheets

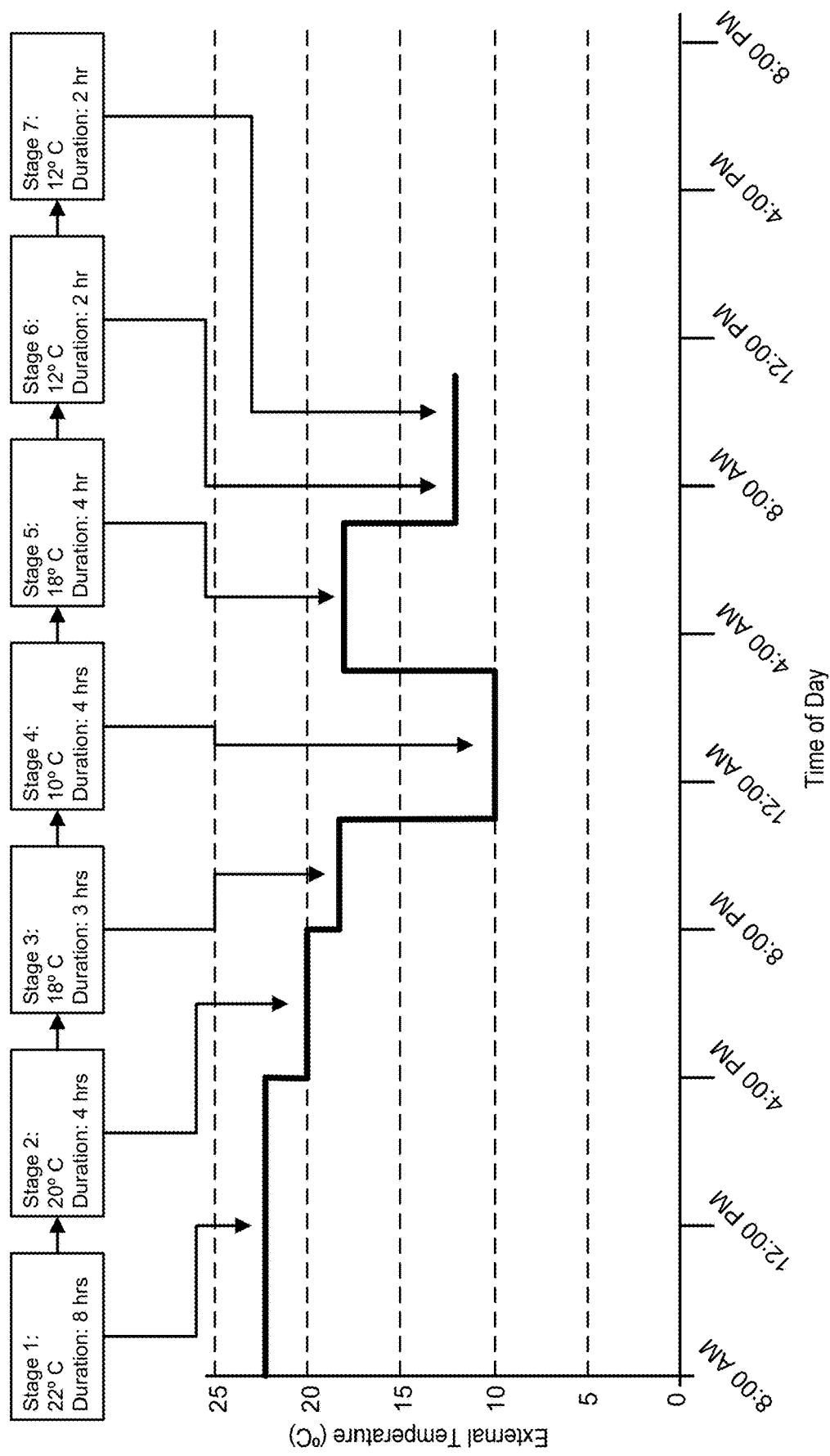

DETERMINING COLD-CHAIN SHIPMENT PACKAGING

CROSS REFERENCE TO RELATED APPLICATION

This application is a continuation of U.S. application Ser. No. 15/271,798, which was filed on Sep. 21, 2016 and is titled "Determining Cold-Chain Shipment Packaging," the entire disclosure of which is expressly incorporated herein by reference.

TECHNICAL FIELD

The present disclosure relates generally to determining shipment packaging and, more particularly, to using data indicative of anticipated conditions along a transit route to calculate the appropriate packaging for a cold-chain shipment.

BACKGROUND

A cold-chain is a temperature-controlled supply chain that is used to extend and help ensure the shelf life of various products that may be benefit from cold temperature storage and/or transit. For example, cold-chain shipments may be utilized for products such as fresh agricultural produce, seafood, frozen food, photographic film, chemicals, and pharmaceutical drugs. Typical regulatory requirements and/or manufacturer preferences may state a range of temperatures, i.e., an upper and lower temperature limit, for which cold-chain shipments must comply. That is, products shipped via a cold chain are typically required to maintain their temperature during transit within this upper and lower temperature limit.

To accomplish this, typical cold chain shipments may utilize refrigerated warehouses and/or refrigerated transportation, such as refrigerated trucks, for example. Furthermore, cold-chain shipments may also utilize insulated shipping containers and/or specialized packaging. Specialized packaging may include, for example, phase change materials such as frozen ice packs, gel packs, dry ice, etc. When specialized packaging is used, however, the same packaging is typically used without regard to the changes in temperature or weather conditions along the transit route. In other words, the same size shipping container and the layout of phase change materials and/or dunnage within the shipping container may be used for each cold-chain shipment.

As a result, a particularly hot or cold transit route may result in temperature excursions. Furthermore, because temperature fluctuations along the route are unaccounted for, money may be wasted when a particular cold-chain product is shipped along a transit route using an unnecessary or excessive amount of phase change materials. Therefore, although cold-chain shipments are vital to several industries, improvements may be made to the logistic processes used for such shipments.

SUMMARY

Various embodiments are described to compensate for weather and other extraneous temperature conditions along a transit route when preparing cold-chain shipment packaging. Upon receiving order information for a cold-chain shipment, an origin and destination of the shipment may be determined to calculate one or more transit routes, which may include each stage along the transit route such as, for example, shipping centers, shipping hubs, and/or various means of transportation systems between shipping centers and hubs such as ground transportation or flights. Weather data may be received from one or more sources for one or more locations, which may include, for example, the origin, destination, and shipping centers and/or shipping hubs used in accordance with one or more shipping carriers. Furthermore, intermediate transit routing stage data may be received from one or more sources to determine the conditions for transit stages between other stages for which location data is available, such as transit between shipping hubs and distribution centers, for example.

The location of the origin, destination, and shipping centers and/or shipping hubs may then be correlated to the weather data, while the intermediate transit routing stage data may be utilized to fill in the gaps for intermediate stages between these locations. As a result, a complete temperature profile may be calculated that includes, for each stage along a transit route, the expected external temperature and duration at each stage of transit to which the cold-chain shipment will be exposed.

Once the temperature profile is calculated for one or more transit routes, embodiments include performing thermodynamic calculations on one or more packaging configurations. These packaging configurations may include, for example, various combinations of phase change materials, container sizes, container materials, insulation, dunnage, etc. Upon performing the thermodynamic calculations for each transit route's temperature profile, the probability or risk of the shipped product's temperature falling outside of a desired or mandatory temperature range (i.e., the occurrence of an excursion), along each transit route may be calculated. Because the actual transit route may not be known with total certainty, the probability of the cold-chain shipment being shipped along each transit route may be calculated. Embodiments include using any suitable combination of transit route probabilities in conjunction with the risk of an excursion occurring for each transit route and/or other predetermined requirements (e.g., cost) to determine the "best" available packaging configuration. The calculated packaging configuration may then be displayed to a user (or if none are available, such an indication may be displayed) to facilitate cold-chain packaging of the product and shipment.

Embodiments also include continuously and/or dynamically updating the weather data and/or intermediate transit routing stage data used as part of the thermodynamic calculations. That is, the transit routes used by each shipping carrier may be analyzed and/or updated over time to increase the accuracy of calculations. Furthermore, the number and/or location of shipping centers and/or shipping hubs may be updated over time to improve the accuracy of the temperature profile along a particular transit route. To provide yet another example, the temperature and/or duration between shipping centers and/or shipping hubs, as well as the means of transportation between these transit stages, may likewise be updated over time as new data is received and analyzed.

BRIEF DESCRIPTION OF THE DRAWINGS

The Figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIG. 3B is a graph 350 indicating a temperature profile used to select a package configuration (i.e., packout) for shipment, according to an embodiment;

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Embodiments of the present invention provide functionality that allows a user to select the most appropriate packaging option for a particular shipment. In embodiments, a user may enter or scan order information, which is linked to data regarding the origin and destination of a particular shipment. Anticipated external temperature profiles (or "temperature profiles" as alternatively used herein) may be generated for one or more transit routes for each of the different shipping options (e.g., next day air, two day ground, etc.). These temperature profiles may indicate the fluctuations in temperature at each stage of each transit route and a duration of time in which the package is expected to be at each stage of the transit route. A thermodynamic analysis may be performed on several packaging configurations, which includes package size, materials, phase change materials, insulation, dunnage, etc., using the temperature profile, and the best available packaging configuration may be selected to ensure that the temperature of a product shipped does not deviate outside of a set temperature range. Once determined, this information may be displayed to a user, who packages the product accordingly for shipment to the destination.

Figure 1:
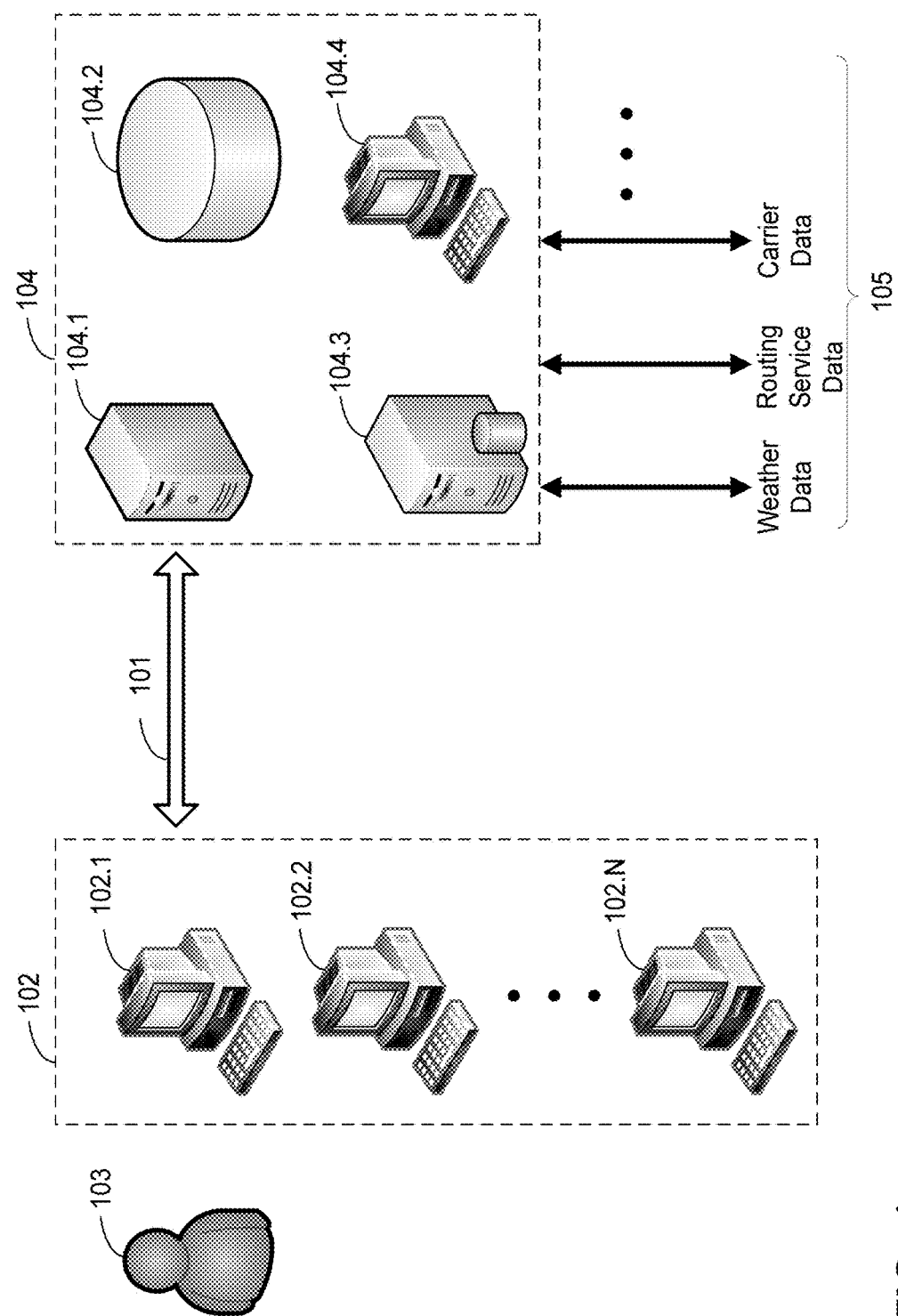
FIG. 1 is a block diagram of an example package selection and identification system 100 in accordance with an embodiment of the present disclosure.

FIG. 1 is a block diagram of an example package selection and identification system 100 in accordance with an embodiment of the present disclosure. Package selection and identification system 100 may be generally separated into a front end 102 and a back end 104, which may communicate with one another via communication link 101. The products shipped via package selection and identification system 100 may include any suitable type of products that are temperature sensitive or that may otherwise benefit from remaining within a desired temperature range during shipment. For example, package selection and identification system 100 may be utilized to ship products in accordance with the logistics of a cold-chain shipping system.

In various embodiments, data communications between front end 102 and back end 104 may take place in accordance with any suitable number and/or type of communication protocols. Therefore, communication link 101 may represent any suitable number and/or type of wired and/or wireless links, network components, data routers, hubs, access points, switches, etc., to facilitate such communications.

Front end 102 may include any suitable number N of front end components 102.1-102.N. Front-end components 102.1-102.N may be implemented, for example, as any suitable type of client devices configured to display a graphical user interface to one or more users, such as a user 103, for example. These client devices may include, for example, specialized or general computing devices such as desktop computers, tablet computers, portable computing devices, smartphones, etc., which are configured to locally execute one or more applications and/or to execute applications via communication with back end 104.

In various embodiments, front-end components 102.1-102.N may represent various clients that are in the same location, or spread out across several different locations. For example, front-end components 102.1-102.N may represent clients located in one or more warehouses or other shipping centers, which are used to facilitate packaging products for shipment to a particular destination. The origin of the shipment may be from the same location as the client devices associated with front end 102, or a different location, in various embodiments.

In an embodiment, a user may initiate preparing a package for shipment via package selection and identification system 100 upon receiving an order. This order may be designated via any suitable unique order identifier, such as an order number, for example. The unique order identifier may additionally or alternatively encoded as an image representation of machine-readable data, such as a barcode, for example. The order may be sent to one of front-end components 102.1-102.N in an electronic manner or a physical order may be delivered to a user.

In any event, the user may scan the order via an optical reader (e.g., a barcode scanner) or otherwise enter the unique order identifier into one of front-end components 102.1-102.N. Once this information is entered, one or more front-end components 102.1-102.N may send this data to back end 104. Back end 104 may then utilize this data to determine a packaging configuration based on an anticipated temperature profile using forecasted weather information and/or intermediate transit routing stage data associated with a transit route that is used to ship the product to the destination in accordance with the order information, which is further discussed below. Once a particular packaging configuration is determined, back end 104 may communicate this information to front end 102, and one or more front-end components 102.1-102.N may display the identified package configuration to user 103, who may package the product accordingly for shipping.

Back end 104 may include any suitable number of back-end components, which may include any suitable type of components configured to receive, send, store, and/or analyze data to facilitate the appropriate embodiments as described herein. For example, as shown in FIG. 1, the one or more back-end components implemented via back end 104 may include one or more servers 104.1, one or more databases 104.2, one or more database servers 104.3, and/or one or more terminals 104.4. Although FIG. 1 illustrates back end 104 as implementing four different types of back-end components, embodiments include back end 104 implementing any suitable number and/or type of back-end components to facilitate the appropriate functions of the embodiments as described herein.

For example, server 104.1 may be implemented as any suitable number and/or type of servers that are configured to receive data from various components such as other back-end components, one or more front-end components 102.1-102.N, and/or one or more data sources 105. In various embodiments, server 104.1 may be configured to process application programming interface (API) service calls, to support one or more applications installed on one or more front end components 102.1-102.N, and/or to process data and/or perform various calculations using data received from one or more data sources 105, which is further discussed below with reference to FIG. 2.

Database 104.2 may be configured as any suitable number and/or type of storage devices. For example, database 104.2 may include one or more storage devices configured to store, delete, update, and/or modify data in accordance with one or more commands received from one or more other back-end components, one or more front-end components, and/or other suitable computing devices. For example, database 104.2 may include any suitable combination of one or more storage mediums such as hard disk drives, solid state memory, cloud-based storage devices, etc.

In various embodiments, database 104.2 may be configured to store any suitable type of data as described in the embodiments presented herein relevant to the operation of package selection and identification system 100, such as test data used as part of thermodynamic analyses, for example. For example, database 104.2 may be configured to store data received from one or more data sources 105 to build a local database of information that may be updated as new data is received or in accordance with any suitable schedule. To provide another example, database 104.2 may store information specific to the products shipped via package selection and identification system 100. For example, database 104.2 may include a list of order numbers correlated to origin and destination shipment addresses or other location information, such that upon receiving the order information from front end 102, one or more back-end components may identify the origin and destination addresses for each particular order.

In various embodiments, the data included in database 104.2 may include the details of a particular order to facilitate the generation of temperature profiles and the identification of an appropriate packaging configuration. For example, database 104.2 may include an indication of whether a signature is required, the size of the order (which may initially eliminate some package configurations) or other detailed instructions regarding the shipment. To provide another example, database 104.2 may include zip codes associated with the destination and origin for a particular order number, zip codes associated with a selected carrier's shipping centers and/or shipment hubs that will be used for a specific order that is identified by the order number.

To provide yet another example, database 104.2 may include information related to a duration of time and/or temperature of stages within one or more transit routes to facilitate the calculation of temperature profiles, such as the average time packages are at various stages for each carrier, the average temperature at stages in which weather information is unavailable (e.g., during flights between shipping centers or hubs), etc. Details of the specific type of information that may be stored in database 104.2 to facilitate the calculation of temperature profiles is further discussed below.

Database server 104.3 may be configured as any suitable number and/or type of servers, and may be configured to perform substantially similar functions as server 104.1. In some embodiments, server 104.1 and database server 104.3 may be implemented as a single device, and thus both server 104.1 and database server 104.3 may not be necessary in some embodiments. But in other embodiments, database server 104.3 may perform dedicated database operations while server 104.1 performs communication and analytical-based functions.

For example, server 104.1 may handle communications with front end 102 and perform calculations related to the identification of a particular package configuration for a specific order, such as receiving order information and querying database 104.2 using the order identifier (e.g., an order number). Using information accessed via database 104.2, server 104.1 may identify or otherwise calculate transit routes, generate temperature profiles for one or more transit routes, perform thermodynamic calculations in accordance with the temperature profiles, identify an appropriate package configuration based upon these thermodynamic analyses, and/or send the identified package configuration to one or more front end components 102.1-102.N.

In some embodiments, database server 104.3 may facilitate the maintenance of data stored in database 104.2, for example, by communicating with one or more data sources 105 to receive and store to database 104.2 data relevant to the operation of package selection and identification system 100. These communications may take place in accordance with any suitable number and/or type of communication protocols, such as via API service calls, for example. In various embodiments, data sources 105 may include any suitable number and/or type of data sources. For example, data sources 105 may include one or more publicly accessible websites or data otherwise retrieved via the Internet and/or one or more private data sources such as third party data providers. To provide another example, data sources 105 may include links to stored data indicative of the details of the conditions at various stages within a transit route. To provide yet another example, data sources 105 may include product data (e.g., product size, weight, dimensions), and/or packaging data (e.g., the various types of materials used to construct various package configurations, the thermal properties and/or size of materials, etc.). In this way, database server 104.3 may receive and store to database 104.2 data indicative of transit route information, weather information, and/or intermediate transit routing stage data for one or more stages along various transit routes, which is used to generate temperature profiles. Furthermore, database server 104.3 may store to database 104.2 details associated with various package configurations, which may be modified and/or provided as needed for the various thermodynamic analyses performed in accordance with the embodiments discussed herein. The details of these calculations are further discussed below.

For example, database server 104.3 may receive carrier data to determine the location of a particular carrier's shipment hub locations and/or distribution center locations, and store this information in database 104.2. To provide an additional example, database server 104.3 may receive routing service data to anticipate one or more transit routes in accordance with a specific mode of shipment (e.g., next-day air delivery, two-day ground, etc.). To provide another example, for one or more transit routes, database server 104.3 may receive weather data using the various zip codes stored in database 104.2 associated with the shipment hub locations and/or distribution center locations, and update this weather information in database 104.2.

Again, database server 104.3 may facilitate the retrieval, storage, and/or calculation of weather information and/or intermediate transit routing stage data. For example, embodiments include database server 104.3 communicating with one or more shipping carrier systems (or via publicly available tracking data made available by the shipping carrier through the Internet, for example) to retrieve and/or track the various details of each shipment. For example, durations of time in which packages are held at each stage in a transit route may be determined based upon package tracking information, which may be used to build a historical log of such durations for each package that is shipped, which may then be stored in database 104.2 and updated as new data is available. To provide another example, database server 104.3 may use package tracking information to determine the actual transit route used for package shipments, so that the selection of transit routes for similar future shipments may be better predicted. To provide yet another example, database server may store to database 104.2 data associated with calibrated test shipments. These calibrated test shipments are further discussed below, and may include measured data from packages shipped with timers, temperature sensors, and/or location tracking systems to track how long packages remain in the various stages of a transit route and/or the external temperatures in which the package is exposed to at each of these stages.

Any of the aforementioned data may be stored in database 104.2 or other suitable back end component and updated, overwritten, or appended as additional data is acquired. For example, database server 104.3 may periodically communicate with one or more data sources 105 (e.g., once a day, 3 times a day, etc.) to receive updated weather information and/or intermediate transit routing stage data. In this way, database server 104.3 may update information stored in database 104.2 such that the accuracy of data used for the determination of package configurations for each shipment becomes more reliable over time.

Terminal 104.4 may be implemented as any suitable type of computing device configured to facilitate user interaction with one or more back-end components of back end 104. For example, a user may interact with terminal 104.4 to update the various applications, algorithms, programs, code, etc., that are executed via one or more back-end components of back end 104. This may include, for example, updating how temperature profiles are generated and/or how thermodynamic calculations are performed as new data is obtained over time to improve the accuracy of these calculations.

Figure 2:
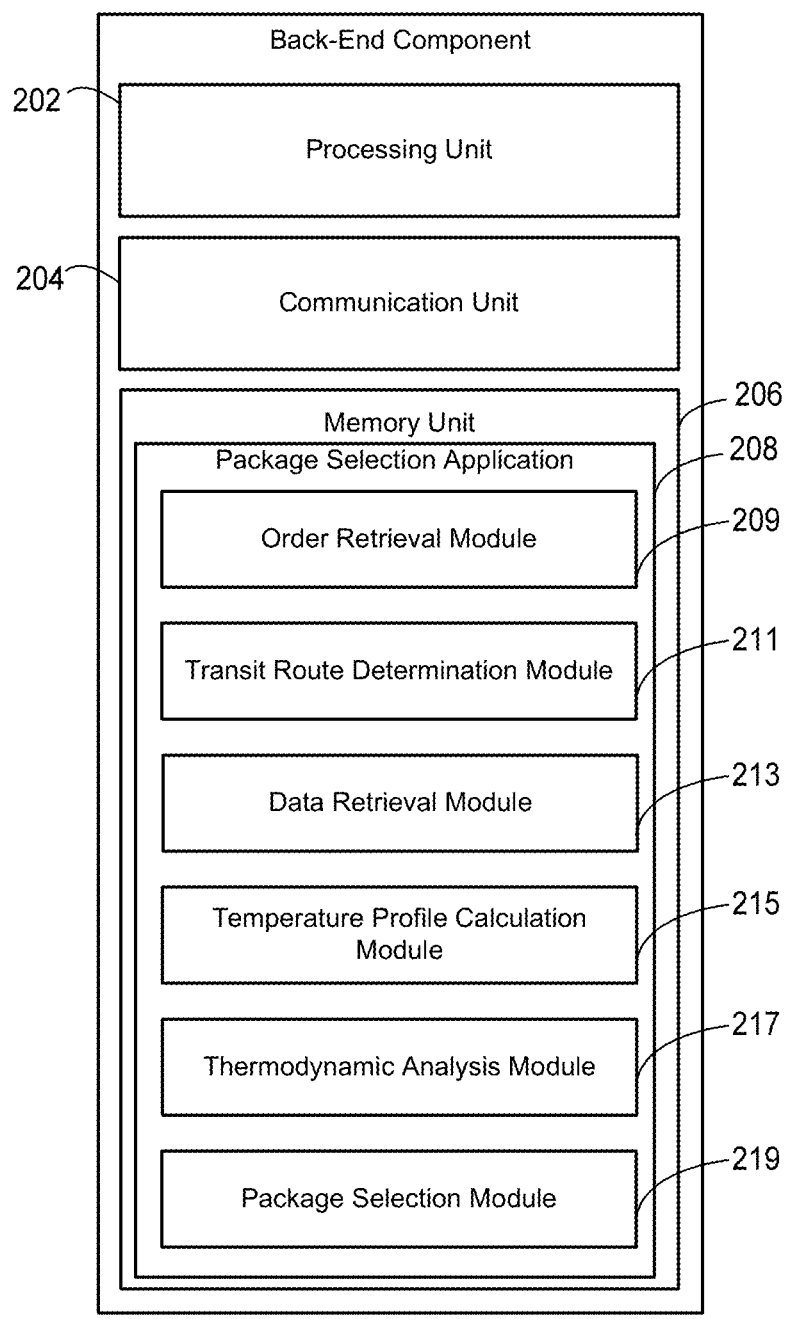
FIG. 2 is a block diagram of an example back-end component 200, according to an embodiment.

FIG. 2 is a block diagram of an example back-end component 200, according to an embodiment. In an embodiment, back-end component 200 may be an implementation of one or more back-end components that are implemented as part of back end 104, for example, as shown in FIG. 1. For example, back-end component 200 may be an example implementation of server 104.1 and/or database server 104.3, for example, as shown in FIG. 1. In an embodiment, back-end component 200 may include a processing unit 202, a communication unit 204, and a memory unit 206.

Communication unit 204 may be configured to facilitate data communications between back-end component 200 and one or more other components (e.g., front-end and back-end components), computing devices, and/or networks in accordance with any suitable number and/or type of communication protocols. For example, communication unit 204 may be configured to facilitate communications between back-end component 200 and one or more back-end components 104.1-104.4 that are part of back end 104, one or more data sources 105, and/or one or more front-end components 102.1-102.N, as shown in FIG. 1 via one or more communication protocols.

Communication unit 204 may be configured to implement the same communication protocols for various types of communications or different communication protocols based upon the particular device, network, component, etc., with which back-end component 200 is communicating. In various embodiments, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, antennas, etc. The details of such communications will be discussed in further detail below.

In various embodiments, processing unit 202 may be implemented as any suitable number and/or type of processors configured to process and/or analyze data received via communication unit 204 and to control and execute various tasks and/or functions of one or more components of back-end component 200. For example, processing unit 202 may be implemented as a host processor for the relevant device in which back-end component 200 is implemented. Processing unit 202 may communicate with and/or otherwise interact with one or more components of back-end component 200 (or other suitable components) to facilitate one or more functions of the embodiments as described herein.

Furthermore, processing unit 202 may be configured to communicate with one or more of communication unit 204 and/or memory unit 206 to send data to and/or to receive data from one or more of these components. For example, processing unit 202 may be configured to communicate with memory unit 206 to store data to and/or to read data from memory unit 206. In accordance with various embodiments, memory unit 206 may be a computer-readable non-transitory storage device, and may include any combination of volatile (e.g., a random access memory (RAM)), or a non-volatile memory (e.g., battery-backed RAM, FLASH, etc.). In an embodiment, memory unit 206 may be configured to store instructions executable by processing unit 202. These instructions may include machine readable instructions that, when executed by processing unit 202, causes processing unit 202 to perform various acts.

For example, processing unit 202 may be configured to, alone or via execution of instructions stored in the various modules of memory unit 206, to process order information, correlate order information to one or more databases to determine a particular shipment's origin and destination, calculate one or more transit routes for a particular shipment, calculate temperature profiles based upon weather data and/or other information, perform one or more thermodynamic analyses on various package configurations for a specific temperature profile, select a shipping package configuration, send the selected package configuration to a front-end component, etc. The details associated with these functions are further discussed below.

In an embodiment, package selection application 208 is a portion of memory unit 206 configured to store instructions, that when executed by processing unit 202, causes processing unit 202 to perform various acts in accordance with applicable embodiments as described herein. For sake of explanation and brevity, package selection application 208 is illustrated and described herein as including various separate modules to facilitate the various functions performed by back-end component 200. These modules may represent, for example, the computer-readable and/or executable instructions, algorithms, and/or code that may be stored in memory unit 206. However, it will be understood that the functions represented by each of these modules may be shared among other modules and/or other components or devices, and that the organization and storage computer-readable instructions implemented via back-end component 200 may be structured in any suitable manner. For example, as discussed above, some functions described herein with respect to back-end component 200 may be performed via a database server while other functions may be performed by a different type of computer server.

Order retrieval module 209 may include executable instructions, algorithms, and/or code to facilitate correlating a received order to specific order details. For example, order retrieval module 209 may work in conjunction with communication unit 204 to receive a unique order identifier (e.g., an order number) and to query one or more components (e.g., back-end components such as databases) for the details associated with that order identifier. In some embodiments, the order identifier may be correlated to order details based upon predetermined settings or preferences. For example, a specific order identifier associated with the delivery of a product to ABC Inc., may result in generating order details such as a specific courier, mode of transit (e.g., next-day air, two-day ground, etc.), the shipping destination, whether a signature is required upon delivery, etc., according to ABC's standing instructions or other preferences. To provide another example, back-end component 200 may receive, in addition to an order identifier, additional information such as a requested mode of transit and shipping carrier. In any event, embodiments include order retrieval module 209 generating all suitable details for a particular shipment such that one or more transit routes may be calculated, which is further discussed below.

Transit route determination module 211 may include executable instructions, algorithms, and/or code to calculate one or more transit routes for a particular shipment based upon the order details for a specific order. For example, as discussed above, the order details may include the shipment's origin, destination, a shipping carrier, whether a signature is required, and a mode of transit. Thus, for a particular shipping carrier and mode of transit, transit route determination module 211 may facilitate the calculation of various transit routes based upon the origin, destination, and the location of that courier's shipping distribution centers and shipping hubs.

In various embodiments, transit route determination module 211 may calculate an anticipated route in a number of ways. For example, with reference to FIG. 1, routing service data may include information received from or associated with a particular carrier used for the shipment. In such a case, the routing service data and/or carrier data, for example, as shown in FIG. 1, may be provided by the carrier or another party and indicate the particular route that a shipment will follow, among other information. This route may indicate, for example, various levels of information such as the specific location of shipping distribution centers and shipping hubs for a particular shipment, the modes of transit between the shipping distribution centers and shipping hubs, and/or the anticipated times in which the package will be located at each of these locations. In other words, the carrier may have a priori knowledge regarding the routing of a particular shipment once an origin, designation, and specific mode of shipment are known, or the carrier may accurately forecast this information. If such information is readily available, embodiments include transit route determination module 211 using this information to calculate a route for a particular shipment along with other information useful for the generation of an anticipated temperature profile.

In other instances, however, data may not be readily ascertained directly from a carrier regarding a shipment route. Therefore, embodiments include transit route determination module 211 calculating a route using aggregated data from previous shipments, which may be stored in one or more databases or other locations and retrieved as needed. For example, with reference to FIG. 1, database 104.2 may store a historical log that includes an aggregation of details associated with previous shipments, which may include various details associated with each of these shipments. These details may include, for example, the mode of shipment, tracking data (e.g., tracking numbers), the route used for each shipment (e.g., the shipping distribution centers and shipping hubs used for each shipment), the time in which the package was located at each stage of transit, the mode of transit between various shipping stages, etc.

The historical log may also include other details associated with previous shipments that may be used to predict a shipping route and/or to otherwise determine information useful in the construction of an anticipated temperature profile for a new shipment. For example, routing service data and/or carrier data, as shown in FIG. 1, may include additional details associated with the transit of a shipment between various stages within a route, thereby allowing for the calculation of an anticipated temperature profile having a finer granularity than one calculated using only the origin, destination, and/or the locations of shipping distribution centers and shipping hubs used for each shipment.

In an embodiment, time information (e.g., timestamps obtained via tracking data) indicated by the historical log may allow for the determination of the mode of transit between various staged in a shipping route. For example, if the specific mode of transit cannot be obtained from the carrier, a similar previous shipment may indicate timestamps associated with when a package arrived at a particular shipping distribution center and a particular shipping hub. Using the timestamp information, an average speed may be calculated and, from this speed information, a determination may be made whether the package was shipped between these two locations via ground or air (e.g., if the average speed is above a certain speed threshold, it may be assumed that the package was shipped via air between these two locations).

In another embodiment, an identifier may be provided (e.g., received as part of one or more data sources 105) from a shipping carrier that indicates whether a shipment is to be shipped (or has shipped in a previous shipment) via ground or air. In accordance with such embodiments, a determination may be made whether a package is to be shipped (or was shipped) via ground or air using this identifying information. Embodiments include a transit route being predicted using any suitable combination of information including, for example, the aforementioned timestamp information and/or carrier identifying information.

However, when attempting to predict an anticipated route for a particular shipment, it may be possible that little or no data is available for a particular destination. For example, the aggregated data from other shipments may not include any (or include very little) information regarding previous shipments to a particular destination zip code. In an embodiment, a threshold number of data points or previous shipments may be set such that, if this threshold amount of data is not available for a particular shipment, shipments to other zip codes within a particular radius may be considered. That is, a radius may be expanded outside of the destination zip code until enough additional destinations are found such that the threshold number of data points is satisfied. A route may then be anticipated, for example, by considering the region associated with each of these zip codes within the expanded area.

Furthermore, because the determination of a particular transit route may not be able to be determined with complete certainty, embodiments include transit route determination module 211 facilitating the calculation of a probability of several transit routes being used by a shipping carrier when shipping the product from the origin to the destination. To do so, embodiments include transit route determination module 211 utilizing historical carrier data correlating how often certain transit routes were used for similar shipments in the past. For example, for an order from Pittsburgh to Chicago via overnight next day delivery with FedEx, historical data may indicate that three different transit routes A-C were used for these types of shipments. Each of these transit routes A-C may include, for example, different combinations of distribution centers, hubs, and modes of transportation (e.g., plane versus truck).

Continuing the previous example, given the current time of year, transit route determination module 211 may facilitate calculating the probability of each of transit routes A-C being used for a current shipment. This calculation may be, for example, based upon the frequency in which each transit route A-C was previously used for shipments that were similar to the present shipment. This similarity may be based, on for example, similar shipment characteristics such as the same type of shipment (e.g., next-day air delivery), the same time (e.g., previous shipments having the same day, month, season, etc., as the current shipment), etc.

Furthermore, if additional shipping options are available, embodiments include transit route determination module 211 facilitating the calculation of transit routes for each available shipping option. For example, if both next-day air and two-day ground shipping are available, transit routes A-C may be calculated for the next-day air shipping option, while transit routes D-F may be calculated for the two-day ground shipping option. As further described below, a temperature profile may be calculated for one or more of these transit routes, which may be utilized to determine the most suitable packaging configuration and, in some instances, the most suitable combination of a particular shipping option and packaging configuration.

Data retrieval module 213 may include executable instructions, algorithms, and/or code to determine the conditions along one or more calculated transit routes for which a shipped package may be exposed. These conditions may include, for example, the temperature that a shipped package is expected to encounter in the various stages along various calculated transit routes and the duration of time the package is anticipated to be at each of these stages. In other words, embodiments include determining not only the conditions at stages along the transit route having fixed or known locations, such as the origin, destination, shipping hubs, and distribution centers, but also the conditions at intermediate stages along the transit route that are not associated with fixed or known locations. For example, intermediate stages may include stages between shipping hubs and distribution centers (e.g., during transportation on an aircraft or truck).

In various embodiments, data retrieval module 213 may retrieve any suitable type of information to facilitate the determination of the conditions at each stage along a transit route. For example, data retrieval module 213 may retrieve any suitable level of forecasted weather details such as the anticipated weather information over the course of a particular time period for stages associated with known locations along the transit route. The forecasted weather data may include data of any suitable level of granularity such as high and low temperatures over the course of a day, or finer details such as the anticipated weather at the specific time the package is expected to be at each location.

For example, as discussed above with respect to transit route calculation module 211, various transit routes may be calculated for each different shipping option. In an embodiment, data retrieval module 213 may retrieve forecasted weather information for each location along one or more of these calculated transit routes. This forecasted weather information may be retrieved, for example, via one or more data sources and/or from a database including this information, as discussed above with reference to FIG. 1. The forecasted weather information may correspond, for example, to forecasted weather data for zip codes corresponding to the location of the origin, destination, shipping hubs, and/or distribution centers along each particular transit route.

In various embodiments, data retrieval module 213 may facilitate retrieving data in addition to, or as an alternative to, weather forecast information to determine the conditions at stages along the transit route. These embodiments may be particularly useful, for example, to determine the conditions of transit stages that may not be associated with defined or known fixed locations. This data may include, for example, the intermediate transit routing stage data, which may be utilized to determine the conditions for transit stages between other stages for which location data is available.

For example, and as mentioned above with reference to FIG. 1, embodiments include collecting intermediate transit routing stage data including temperature and time duration information along various transit routes by sending calibration shipments. Calibration shipments may be used to measure this data for transit route stages not associated with shipping hubs, distribution centers, or other known or fixed locations along the transit route. These calibration shipments may include temperature sensors, timers, and/or location tracking components to measure data such as the external temperature and time duration at stages in which a package is on an aircraft or truck between shipping distribution centers and hubs. To provide another example, intermediate transit routing stage data may include data based on average temperatures at commonly-used altitudes for air freight (i.e., as the in-flight portion of an air-freight transit stage would typically be the longest duration of the stage at this temperature). To provide yet another example, data retrieval module 213 may retrieve, calculate, or otherwise obtain as intermediate transit routing stage data an average of the historical durations of time at each respective stage in the transit route as indicated by the aforementioned historical log stored in database 104.2. These average times may be used, for example, via temperature profile calculation module, which is further discussed below.

In some embodiments, data retrieval module 213 may facilitate gathering weather forecast data and/or intermediate transit routing stage data for a single transit route, such as a transit route having the highest probability of being used for a particular shipment, for example, as discussed above with respect to transit route determination module 211. But in other embodiments, data retrieval module 213 may facilitate gathering weather forecast data and/or intermediate transit routing stage data for locations along each calculated transit route for each shipping option, and a shipping option may be selected from the results of the thermodynamic analysis for each of these transit routes, which is further discussed below.

Temperature profile calculation module 215 may include executable instructions, algorithms, and/or code to calculate a temperature profile for one or more calculated transit routes for a particular shipment. To do so, temperature profile calculation module 215 may utilize collected weather data and/or additional types of data indicative of the weather at each stage of one or more transit routes. In other words, temperature profile calculation module 215 may utilize intermediate transit routing stage data and/or weather data to generate a temperature profile for a particular shipment, indicating the conditions at each stage along the transit route. Again, each stage may represent how the package is moved from the origin to the destination, which may include the origin, destination, shipping hubs, distribution centers, and the mode of transportation used between shipping hubs and distribution centers.

Therefore, this calculated temperature profile may represent an anticipated external temperature profile that may include not only the anticipated external temperature at each stage within a particular transit route, but the duration of time that the package will be exposed to the anticipated external temperature at each transit stage. In an embodiment, historical data for similar shipments or other suitable calculations (e.g., the average of previous durations at stages from past shipments) may be utilized to anticipate when a particular shipment will be at each stage along the transit route. This information may then be leveraged to correlate when the package will be at each of these stages to the temperatures indicated by the weather forecast data and/or the intermediate transit routing stage data at each of those locations at the same time. The details of the temperature profile associated with an example transit route are further discussed below with reference to FIG. 3A.

In various embodiments, the anticipated temperature profile may calculated in accordance with any suitable level of granularity while taking into consideration any suitable number of external conditions along a shipping route likely to be encountered by a particular shipment. That is, as discussed above data may be collected to build an anticipated temperature profile having any suitable level of granularity, which may represent not only the anticipated temperature at the destination, origin, shipping centers, and shipping hubs, but the temperature at any suitable number of locations along the route.

For example, to determine the temperature conditions along a particular route, weather data may be correlated to each zip code through which a truck or aircraft is anticipated to travel. For aircraft, the temperature for an aircraft may be assumed to be fairly stable, and an estimated or historical average of previous temperatures may be used accordingly. However, embodiments also include determining changes in temperature along a flight path based upon collected data, which may indicate temperature conditions at various altitudes and/or times for a particular shipment. To provide an illustrative example, using timestamps indicated by the historical log, the aircraft's altitude and duration at each altitude between transit stages may be determined. Using this information, the weather along the flight path may be considered in conjunction with the altitude data to anticipate the temperature likely to be experienced by a package during that particular stage of transit.

For ground shipments, the historical log may include other detailed information associated with the specific mode of transit used to ship a package between the origin, destination, distribution centers, and/or shipping hubs. That is, a carrier may historically use a contracted ground carrier that has trucks of a specific design and/or exterior color. In an embodiment, temperature profile calculation module 215 may consider the temperature conditions likely to be experienced by a package while on a truck by utilizing such detailed information. For example, temperature profile calculation module 215 may correlate weather information to each zip code through which the truck is anticipated to travel (or a maximum number of such zip codes to reduce the number of calculations needed to be performed) and determine the impact of such weather information on the truck based upon the truck's external color, whether the truck has a temperature-controlled interior, etc. In this way, as additional data is collected regarding the specifics associated with different transit stages within a route, this data may be used to calculate a more accurate anticipated temperature profile. Of course, the anticipated temperature for a ground shipment transit stage may also be assumed, or an estimated or historical average of previous temperatures may be used as well.

Thermodynamic analysis module 217 may include executable instructions, algorithms, and/or code to perform any suitable number and/or type of thermodynamic analyses. For example, a thermodynamic analysis may include one or more calculations performed in accordance with the "melt rate equation," to calculate a time in which objects melt, or change phase, upon being exposed to various changes in the external temperature. The thermodynamic analyses may utilize data from one or more suitable data sources (e.g., data sources 105 and/or data stored in one or more backend components that are part of back end 104). For example, the thermodynamic analyses may utilize data obtained via calibrated test shipments, data obtained via simulations, data obtained via controlled environmental testing, and/or other types of suitable test data that may be obtained over time as packages are shipped. In this way, the thermodynamic analyses may be tuned, modified, and/or adjusted over time to more accurately portray real-world results.

In an embodiment, a thermodynamic analysis may be performed on a product packaged in a specific package configuration having a particular package size, package materials, phase change materials, dunnage, etc. This thermodynamic calculation may determine, for a specific package configuration, whether or not the product will stay within the acceptable temperature range (e.g., via the calculation of an anticipated product temperature profile) during shipping along a transit route in accordance with a particular anticipated external temperature profile. This calculation may be repeated for several package configurations and temperature profiles associated with different transit routes to select the most appropriate package configuration (e.g., one having the highest probability of the product's temperature not deviating outside of a temperature range when shipped via a particular transit route, the lowest cost packing option that still meets product storage requirements, etc.).

For example, assume that for a single shipping option, such as next-day air delivery, three transit routes A-C are calculated. Further assume that transit route A is identified as the most-frequently used transit route for previous shipments going to the same destination, the same carrier, and in same month as the current shipment. Therefore, embodiments include back-end component 200 determining that transit route A has the highest likelihood of being used for the current shipment. Continuing this example, the temperature profile generated for transit route A may be used as part of a thermodynamic analysis to analyze several different package configurations.

For each package configuration that is thermodynamically analyzed in accordance with transit route A's temperature profile, an anticipated product temperature profile may be calculated. Each anticipated product temperature profile may represent the calculated fluctuations in the temperature of the product as a result of being shipped in that particular package configuration along transit route A. That is, the anticipated product temperature profile is a result of a thermodynamic analysis that uses the temperature profile generated for transit route A to determine, for each of several available package configurations, how the temperature of a product will fluctuate. An example of an anticipated product temperature profile calculated in this manner is provided in FIG. 4, the details of which are further discussed below.

Embodiments include the thermodynamic analysis being performed in accordance with any suitable level of granularity. For example, in some embodiments, the temperature at each transit stage of the anticipated temperature profile may represent a time-temperature average. In accordance with such embodiments, the thermodynamic analysis may be calculated using this time-temperature average data.

However, in other embodiments, the temperature used at each transit stage may take into account instantaneous fluctuations and/or the maximum and minimum temperatures at each transit stage. For example, the time-temperature average for a particular stage may indicate that a package will be exposed to a temperature of 18 degrees Celsius for one hour. However, during that one hour, the package may actually be exposed to a maximum temperature of 22 degrees Celsius and a minimum temperature of 14 degrees Celsius. Embodiments include the thermodynamic analysis being performed over any suitable number of time intervals within a particular transit route to compensate for such fluctuations. In this way, embodiments include the calculation of an anticipated product temperature profile in accordance with any suitable level of time wise granularity to account for temperature deviations that may result in a temperature excursion. Additional examples of different types of thermodynamic analyses are provided with reference to FIG. 4 and discussed further below.

Package selection module 219 may include executable instructions, algorithms, and/or code to calculate a package for a particular shipment. In an embodiment, the package selected may have a specific packaging configuration, which is selected from several package configurations. In various embodiments, the package may be selected in any suitable manner that ensures the most suitable option for a particular shipment, i.e., that certain packaging requirement are met such as cost, materials, and/or the best option to ensure that product storage requirements are met. For example, the package may be selected that has an anticipated product temperature profile associated with the highest probability of the product's temperature not deviating outside of a temperature range when shipped via a particular transit route. This probability may be determined, for example, by determining which anticipated product temperature profile results in the greatest margin between upper and lower temperature limits associated with the temperature range. In this way, a package configuration may be selected that results in the product's temperature having the greatest amount of margin, or "buffer," between the upper and lower temperature limits. The details of the relationship between the anticipated product temperature profile and temperature range is further discussed below with reference to FIG. 4.

In various embodiments, package selection module 219 may facilitate the selection of a particular shipping option and/or package configuration based upon the results of the thermodynamic analysis. That is, in various embodiments, the thermodynamic calculations may be repeated for different transit routes and for different shipping options. These embodiments may be particularly useful, for example, to determine a lower-cost shipping option that provides an acceptable risk of the product's temperature not deviating outside of a particular temperature range.

To provide an illustrative example using the aforementioned transit routes A-C (for next-day air shipments) and transit routes D-F (for two-day ground shipping), temperature profile calculation module 215 may calculate a temperature profile for each of the 6 transit routes A-F. Thermodynamic analysis module 217 may analyze several package configurations in accordance with each of these 6 temperature profiles to calculate, for each transit route, an anticipated product temperature profile for several package configurations. That is, if there are 12 available package configurations, thermodynamic analysis module 217 may calculate 12 anticipated product temperature profiles, one for each package configuration, for transit route A, and repeat these calculations for each of transit routes B-F.

Continuing this example, package selection module 219 may then select the package configuration and shipping option that results in shipping requirements being met (e.g., the lowest-cost shipping option) as long as the probability of the product's temperature when shipped in this manner is still likely to not deviate outside of the temperature range. To facilitate this determination, a probability threshold may be selected. Embodiments include using the lower-cost shipping option and package configuration such that, as long as the lower-cost shipping option produces a probability of the occurrence of an excursion during shipping that is less than the threshold probability, then the lower-cost shipping option and package configuration may be selected. In other words, even though it may be somewhat less likely that temperature excursions will occur for next-day shipping versus two-day ground shipping, the added cost of the former shipping option may not justify its use if the latter shipping option provides an acceptable level of risk to the shipper.

In an embodiment, package selection module 219 may facilitate determining whether some shipping options are available when receiving a new order for shipment. To provide an illustrative example, if a particular order specifies two-day ground shipping, thermodynamic analyses may be performed on various package configurations associated with the temperature profiles calculated for each two-day ground shipping transit route. The result of this analysis may, however, produce a best-case package configuration that introduces an unacceptable probability of excursion during transit. In such a case, embodiments include package selection module 219 determining the next-best available shipping option that provides a package configuration that ensures (i.e., provides a probability greater than a threshold) that temperature excursions will not occur during shipment. The package configuration information may then be sent to one or more computing devices (e.g., front-end devices 102.1-102.N, as shown in FIG. 1), along with an indication that the initial shipping selection is not available.

In other embodiments, a thermodynamic analysis may not necessarily be performed for every package configuration for each transit route. That is, embodiments include package selection module 219 facilitating a ranking system, whereby thermodynamic analyses are performed starting with the highest ranked package configuration for a particular shipping option. For example, test data may indicate that, from previous shipments or for similar transit routes, that certain package configurations are more preferable than others. Package configurations may be ranked, for example, in accordance with any suitable combination of conditions such as the order of likelihood of a temperature excursion occurring (with lower ranked package configurations being more likely), by cost, preference of shipping materials, etc. Thus, a selected package configuration will meet the temperature excursion requirements, but processing resources may be better preserved by performing the temperature analyses in a particular order of preference such that the first package configuration meeting the specified shipping requirements is selected. In this way, less time is required to select a package configuration when each package configuration does not need to be analyzed.

Figure 3A:
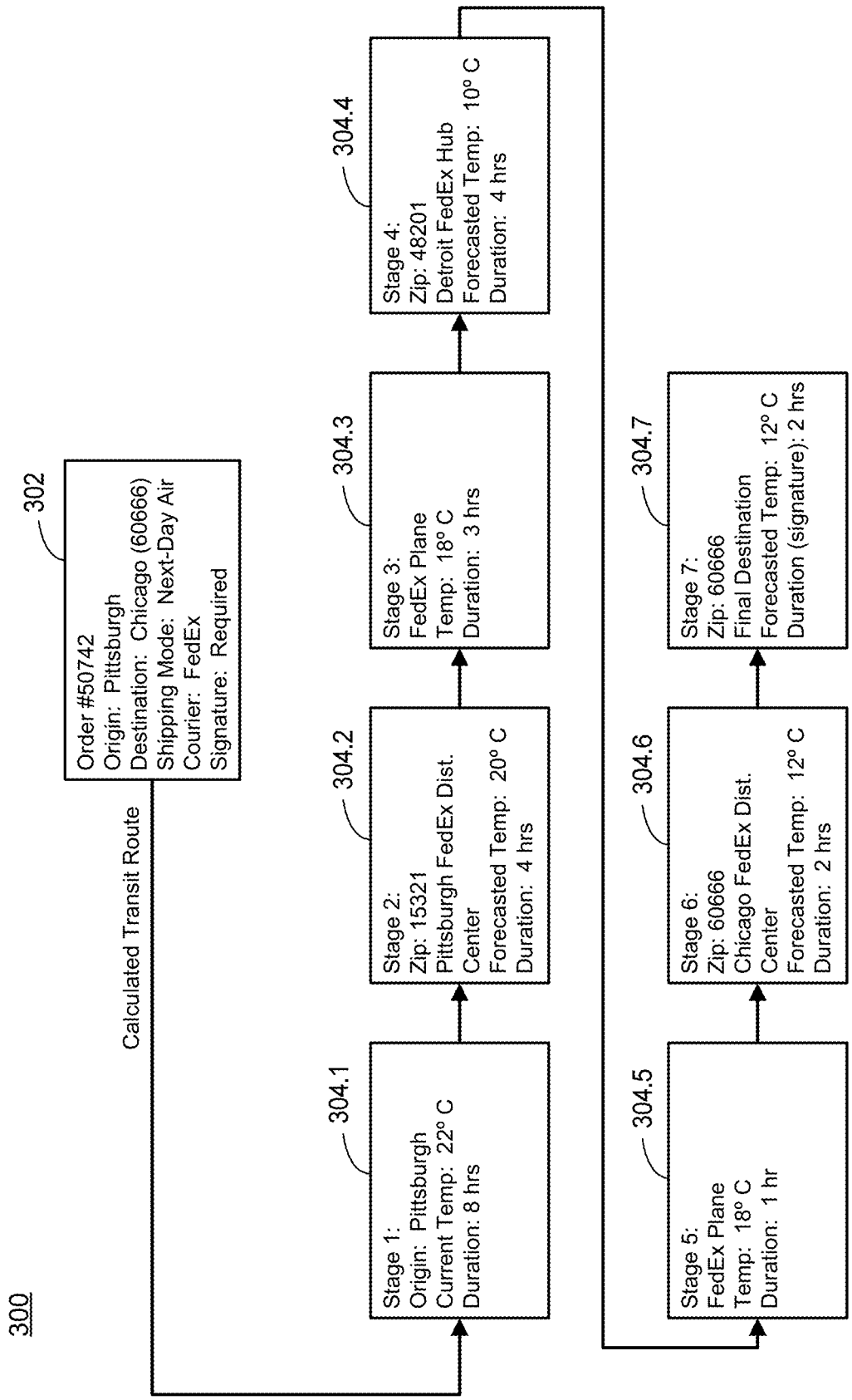
FIG. 3A is an example transit route calculation process 300, according to an embodiment.

FIG. 3A is an example transit route calculation process 300, according to an embodiment. One calculated transit route is shown in FIG. 3A for ease of explanation, but any suitable number of alternate calculated transit routes may be calculated based upon this information.

As shown in FIG. 3A, process 300 indicates order details 302, which correspond to an example order #50742. As discussed herein, one or more back-end components may receive an indication that a shipment is being processed for order #50742, and use the order number to access details associated with that order number. An example of these details are shown in FIG. 3A, which include, for example, the origin of the shipment (Pittsburgh), the destination of the shipment (Chicago), the shipping mode or option (next-day air), the carrier (FedEx), and whether a signature is required (yes).

Using the order details, one or more transit routes may be calculated using information associated with the location of FedEx's shipping hubs and distribution centers when shipping packages next-day air from Pittsburgh to Chicago. Additionally or alternatively, data from a historical log of shipments may be utilized to calculate the transit route.

In an embodiment, the calculated transit route may include not only the origin and destination, but each stage between the origin and destination as well as the anticipated duration the package is expected to be at each stage. For example, the calculated transit route shown in FIG. 3A includes 7 total stages 304.1-304.7. Stage 304.1 corresponds to the origin, Pittsburgh, and includes the current temperature at that location and the anticipated duration of time (8 hours) the package is expected to be there before being taken to a distribution center.

In various embodiments, the initial shipping durations (e.g., at stages 304.1 and 304.2) may be predicated upon various factors such as packing completion and pickup times. For example, if the pickup time is known, then the duration of time the package is anticipated to be at the origin stage 304.1 may be calculated based upon the current time and the scheduled pickup time. The duration of time the package is anticipated to be at stage 304.2, the distribution center in Pittsburgh, may likewise be calculated as a function of the pickup time from origin stage 304.1. For example, because all packages may leave the origin distribution center stage 304.2 and be placed on a cargo aircraft at a certain time, the earlier the package is picked up from stage 304.1, the longer the package will remain at stage 304.2. Alternatively, if the pickup time is not known, maximum or worst-case durations may be used for the durations at stage 304.1 and stage 304.2.

Stage 304.2, as well as stages 304.4, 304.6, and 304.7 are each associated with a physical location having a respective zip code. In an embodiment, weather forecast data may be utilized to determine, for each respective zip code associated with the locations of stages 304.2, 304.4, 304.6, and 304.7, the anticipated external temperature at the time the package is expected to arrive at each stage. Furthermore, as discussed above, historical data from previous shipments or other suitable data sources may be used to determine the duration the package is anticipated to be at these stages.

Stages 304.3 and 304.5, however, represent a mode of transportation between the other stages. Therefore, the temperature and duration the package is anticipated to be at these stages may be determined from various data sources in addition to, or as an alternative to, forecasted weather data. Again, this data may be determined from the intermediate transit routing stage data, which may include historical logged data, tracking information, calibrated shipping measurements, etc., as discussed herein. Furthermore, the duration in which the package is anticipated to be at some stages may be based upon order details. For example, shipments requiring a signature may be outside at the destination less time versus shipments that do not. Therefore, the stages along the calculated transit route may designate a shorter duration of time (e.g., 2 hours) for transit routes requiring signature upon delivery versus those that do not.

FIG. 3B is a graph 350 indicating a temperature profile used to select a package configuration (i.e., packout) for shipment, according to an embodiment. The temperature and duration data for each stage of the calculated transit route from FIG. 3A is shown at the top of FIG. 3B. The temperature profile is graphically illustrated in FIG. 3B with external temperature shown in the vertical axis and the time of day shown in the horizontal axis. As shown in FIG. 3B, once the temperature and duration information is calculated for each stage of a transit route, the anticipated temperature profile for that transit route can be calculated using a reference time, such as 8:00 am, for example, and projecting temperature fluctuations and durations until the anticipated delivery time (e.g., by 11:00 P.M. the next day).

Again, the temperature and duration data for each stage of the calculated transit route as shown in FIG. 3B may correspond to time-temperature averages over each corresponding duration. For example, the 10 degree Celsius temperature associated with stage 4 may represent the average temperature over 4 hours. Embodiments may also include, for example, representing each transit stage to consider the fluctuations within each transit stage. To provide an illustrative example, weather data may indicate, for each zip code associated with stage 4 (or for a single zip code), hourly temperature information as well as a minimum and maximum forecasted temperature over the four hour period in which the package is expected to be routed through these locations. Although not shown in FIG. 3B for purposes of brevity, embodiments include the temperature profile including temperature and duration data indicative of temperature changes of any suitable level of granularity (e.g., each hour) during one or more of the transit stages as opposed to the time-temperature averages shown in FIG. 3B.

Although temperature profile 350 is illustrated graphically in FIG. 3B, embodiments include temperature profile 350 being calculated and/or stored in any suitable manner to facilitate performing one or more thermodynamic analyses, which is further discussed below with reference to FIG. 4.

Figure 4:
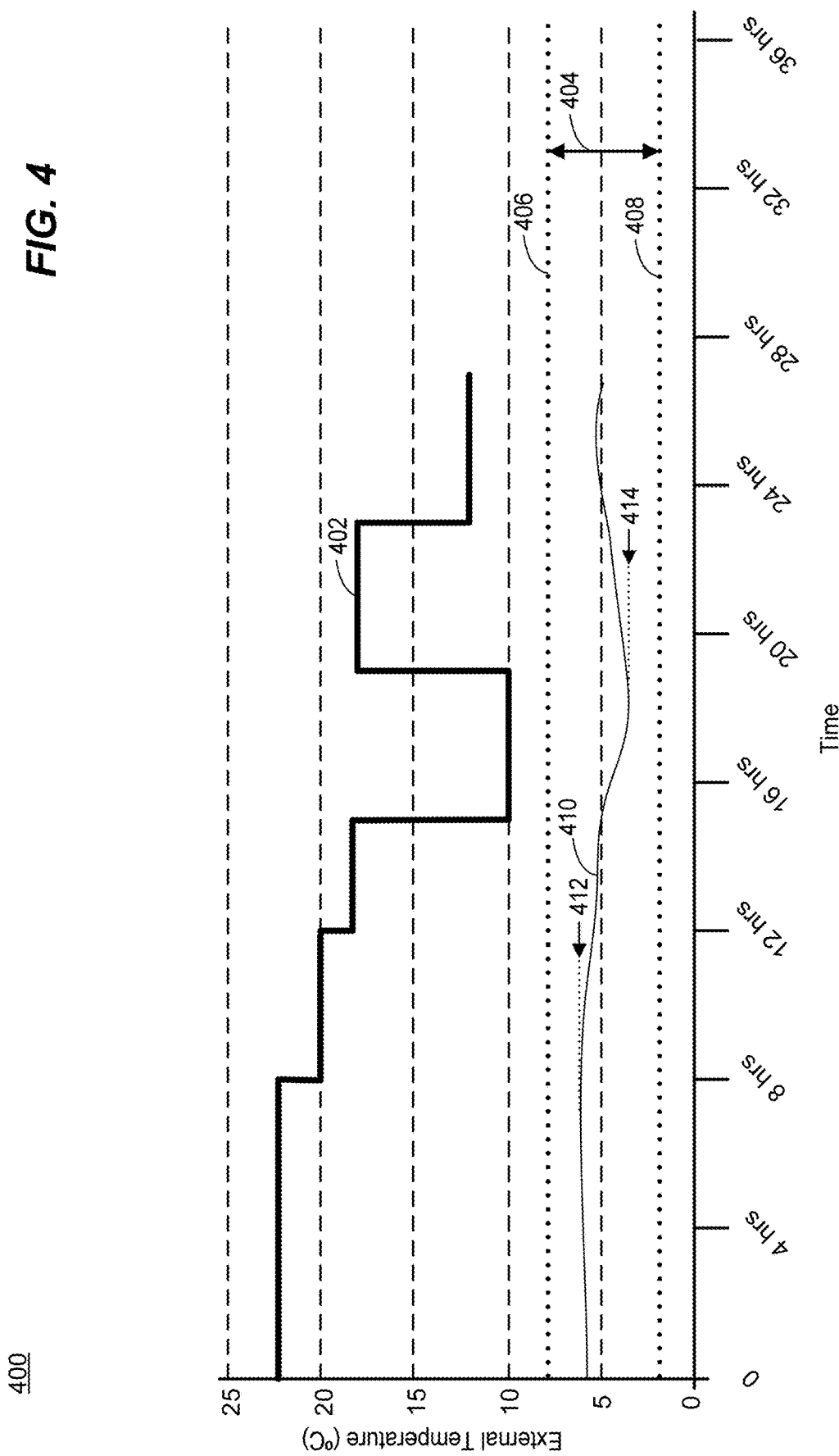
FIG. 4 is a graph 400 indicating the results of an example thermodynamic analysis on a package configuration, according to an embodiment.

FIG. 4 is a graph 400 indicating the results of an example thermodynamic analysis on a package configuration, according to an embodiment. As shown in FIG. 4, graph 400 includes a graphical plot of temperature fluctuations along the various stages of a transit route, as discussed above with respect to FIG. 3B. The temperature fluctuations shown in graph 400 constitute a graphical representation of an anticipated external temperature profile 402, which corresponds to the changes in external temperature over the time of day.

Again, in an embodiment, the product being shipped may need to maintain its temperature within a certain temperature range, which may be any suitable temperature range based upon the particular product that is being shipped. For example, graph 400 indicates a temperature range 404 that includes an upper temperature limit 406 and a lower temperature limit 408. In the example shown in FIG. 4, the temperature range corresponds to an upper temperature limit 406 of 8 degrees Celsius, and a lower temperature limit 408 of 2 degrees Celsius, which corresponds to cold-chain shipment requirements. However, the embodiments described herein may be equally applicable to other temperature ranges. For example, the upper temperature limit 406 and a lower temperature limit 408 could correspond to temperatures used in the shipment of frozen food products, which typically require temperature limits of −10 degrees Celsius and −25 degrees Celsius. To provide another example, the upper temperature limit 406 and a lower temperature limit 408 could correspond to temperatures used in the shipment of controlled room temperature products, which typically require temperature limits of 2 degrees Celsius and 25 degrees Celsius. In any event, a goal of using a particular package configuration is to ensure that the temperature of the product being shipped is maintained within temperature range 404, and excursions (i.e., time periods when the shipped product's temperature deviates outside of this range) are avoided.

To this end, embodiments include performing a thermodynamic analysis of one or more package configurations in accordance with temperature profile 402. Although this process may be repeated for several packages (e.g., all available package configurations) the results of a thermodynamic analysis for a single package configuration are shown in FIG. 4 for purposes of brevity. For example, graph 400 indicates an anticipated product temperature profile 410, which reflects, for a particular package configuration, temperature deviations of a product shipped in that package configuration when exposed to changes in temperatures along a transit route as defined by anticipated external temperature profile 402.

As shown in FIG. 4, anticipated product temperature profile 410 reflects temperature deviations during the transit route. That is, along the transit route, temperature fluctuations may cause anticipated product temperature profile 410 to reach a maximum temperature peak point 412 and a minimum temperature trough point 414. These temperature deviations are acceptable, however, in that no excursions are likely to occur for the selected package configuration. In an embodiment, the margin between the upper temperature limit 406 and temperature peak point 412 and/or the margin between the lower temperature limit 408 and temperature trough point 414 may be utilized to select the appropriate package configuration for shipping a product along a particular transit route.

In various embodiments, various levels and/or types of calculations may be performed as part of the package configuration and selection process (e.g., those performed by back-end component 200, as discussed with reference to FIG. 2). For example, anticipated product temperature profile 410 may correspond to a package configuration that is considered to meet the product storage requirements in accordance with temperature profile 402. In some embodiments, a maximum temperature peak point 412 and a minimum temperature trough point 414 may be calculated in accordance with the thermodynamic analysis. Such embodiments may be particularly useful, for example, when it is desirable to obtain detailed information regarding the probability that a particular package configuration does not experience temperature excursions. But in other embodiments, a thermodynamic analysis may be performed using one or more constraints of the melt rate equation, such as the upper and lower temperature limits 406 and 408, respectively, for example.

For example, in embodiments in which minimum and maximum temperatures are calculated, the upper margin between the upper temperature limit 406 and temperature peak point 412 may be defined as an upper margin UM, while the lower margin between the lower temperature limit 408 and temperature trough point 414 may be defined as a lower margin LM. Continuing this example, assume that the thermodynamic analysis of a particular package configuration for a particular transit route corresponds to anticipated product temperature profile 410, which results in an upper margin $UM_0$ and a lower margin $LM_0$. If a number N of package configurations for which the same temperature profile 402 is anticipated (e.g., for shipments along the same transit route), then the thermodynamic analysis of each package configuration may result in a number of respective anticipated product temperature profiles (i.e., one for each package configuration) producing upper margins $UM_0$–$UM_N$ and lower margins $LM_0$–$LM_N$.

In accordance with such embodiments, a package configuration may be selected that yields, as a result of the aforementioned thermodynamic analysis in accordance with anticipated external temperature profile 402, an upper margin and lower margin having the highest magnitude. For example, in the event that the package configuration corresponding to anticipated product temperature profile 410 yields an upper margin and lower margin having the largest magnitude among other available package configurations, then that package configuration may be selected for shipment along the transit route to which temperature profile 402 corresponds. In other words, embodiments include selecting a package configuration that provides the highest probability of the product's temperature not deviating outside of temperature range 404 when shipped along the transit route. This highest probability may correspond, for example, to a package configuration having an associated anticipated product temperature profile 410 that provides the greatest amount of "buffer" between potential temperature excursions. Additional details of package configurations are provided below with respect to FIG. 5.

However, in embodiments in which maximum and minimum temperatures of the anticipated product temperature profile 410 are not required, a determination may be made whether anticipated product temperature profile 410 is subject to temperature excursions. In other words, calculations may be performed that do not necessarily determine the actual minimum and maximum temperatures, but instead determine whether anticipated product temperature profile 410 is subject to a temperature excursion. This process advantageously allows for the thermodynamic analyses to be performed in a less processing-intensive manner.

In accordance with such embodiments, one or more package configurations may be analyzed to determine whether each package configuration's associated anticipated product temperature profile (for a particular temperature profile 402) passes (temperature excursions do not occur) or fails (a temperature excursion does occur) a temperature excursion test. The package configurations that pass the temperature excursion test may be placed into a queue of available package configurations for a particular transit route or for similar transit routes. In this way, when a package configuration is needed for a specific transit route (or a similar route based upon temperature profile 402) a determination may be made whether additional packaging requirements have been met, such as packaging materials and/or cost. Again, the order in which package configurations may be selected from the passing queue may be established in any suitable manner, such as ranked in order of lowest cost, for example.

In additional embodiments, a secondary check may be performed upon a package configuration being selected (or passing the aforementioned temperature excursion test) when the maximum and minimum temperatures associated with anticipated product temperature profile 410 are not calculated. For example, each thermodynamic calculation may initially be performed as discussed immediately above, in which a thermodynamic analysis is performed to calculate anticipated product temperature profile 410 in accordance with temperature profile 402. However, upon a package being selected or passing the temperature excursion test, a secondary check may be performed that verifies that a temperature excursion does not occur for a particular package configuration by sequentially determining the temperature and time impact through each transit stage.

For example, temperature profile 402 may correspond to each of the transit stages, as shown in FIG. 3B. In embodiments, a thermodynamic analysis may be performed sequentially such that the selected package configuration is first performed in accordance with only stage 1, and a determination is made whether a temperature excursion occurs. Then, the thermodynamic analysis may be repeated for stages 1 and 2 sequentially, to determine whether a temperature excursion will occur. This process may be repeated (e.g., 1+2+3, 1+2+3+4, etc.) until the thermodynamic analysis "walks" the package configuration through the entirety of temperature profile 402. If a temperature excursion occurs at any of these sequential thermodynamic calculations, then the package configuration fails the temperature excursion verification. This may result in, for example, the package configuration being removed from the aforementioned queue of package configurations so that it is unavailable to ship the product along the transit route.

Figure 5:
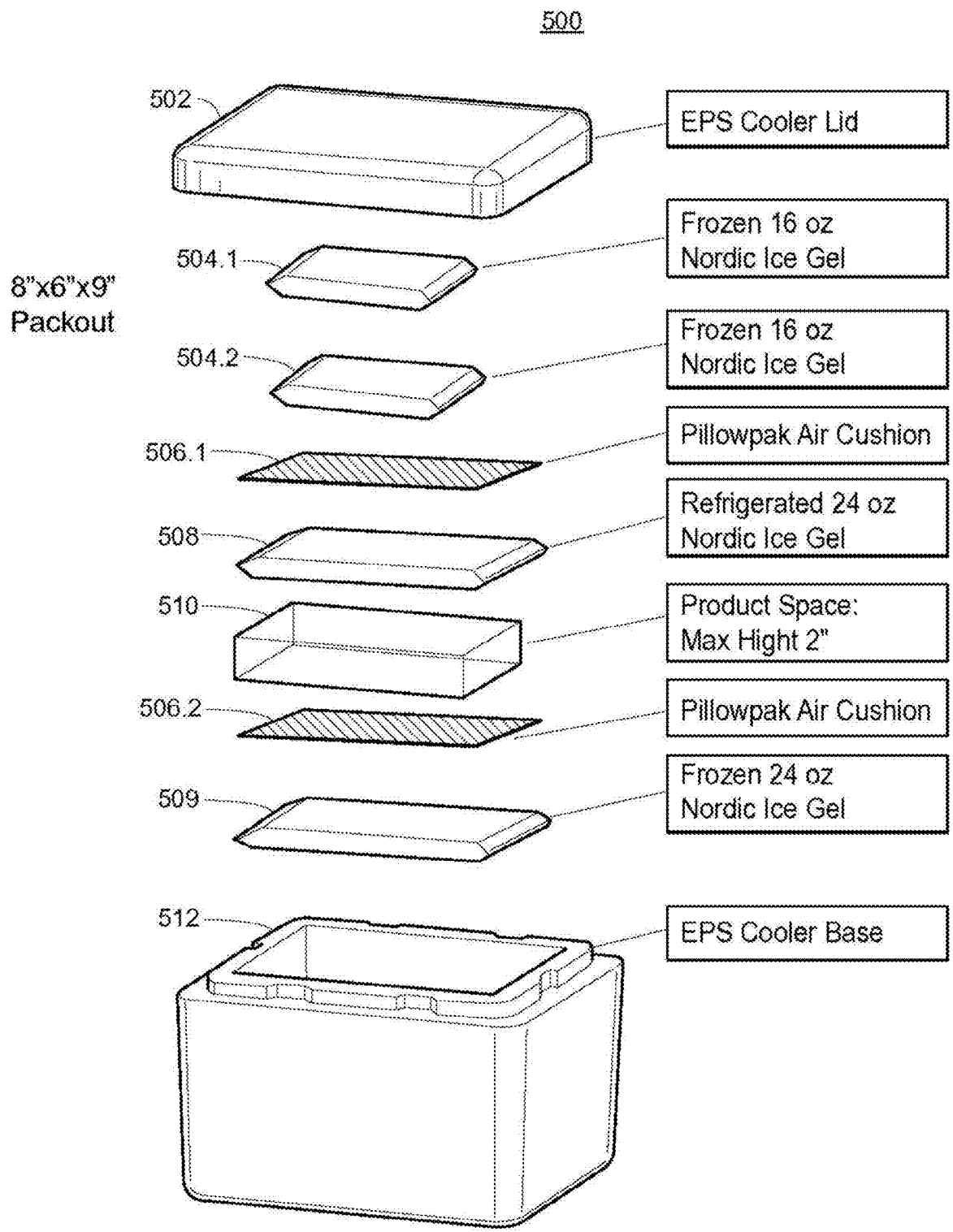
FIG. 5 is an example illustration 500 indicating an example package configuration that may be displayed to a user, according to an embodiment.

FIG. 5 is an example illustration 500 indicating an example package configuration that may be displayed to a user, according to an embodiment. Again, several package configurations may be available for shipment, each including a different combination of package size, package materials, phase change materials, and dunnage. The particular package configuration shown in FIG. 5 may be exposed to a particular anticipated external temperature profile (e.g., anticipated external temperature profile 402), to yield and anticipated product temperature profile (e.g., anticipated product temperature profile 410).

Once a particular package configuration is selected, the details associated with that configuration may be transmitted to one or more computing devices (e.g., to one or more front-end components, as shown and discussed with respect to FIG. 1) and displayed. A user may then view this information to pull the appropriate combination of shipping materials from stock, assemble the package, and ship the product. In an embodiment, the details shown in illustration 500 may represent an example of what may be displayed to a user. However, it will be understood that variations may exist in how this information is displayed. Thus, in various embodiments, the details of a particular package configuration may be displayed in accordance with any suitable combination of graphics, icons, descriptive text, part numbers, etc., to adequately convey this information.

For example, the package configuration shown in FIG. 5 includes a cooler having a specific size, 8"×6"×9", which is made of a specific type of material, i.e., expanded polystyrene (EPS). As shown in FIG. 5, a cooler lid 502 and a cooler base 512 are shown in an expanded view, with dunnage and phase change materials sandwiched between them. The phase change materials may be of different types and/or sizes, and may be oriented within the cooler base 512 in a specific manner. For example, the package configuration shown in FIG. 5 includes three different types of phase change materials: frozen 16 oz. Nordic ice gel packs 504.1 and 504.2, a refrigerated 24 oz. Nordic ice gel pack 508, and a frozen 24 oz. Nordic ice gel pack 509. Furthermore, the package configuration shown in FIG. 5 also includes pillowpak air cushions 506.1 and 506.2. The details associated with the package configuration shown in FIG. 5 may also indicate a maximum space to be allowed for the product to be shipped, as is indicated by block 510 (e.g., a maximum product space of 2"). In this way, different sized packages may be accommodated based upon the size of the product being shipped, which may include more than one package in some instances.

The package configuration shown in FIG. 5, therefore, represents a unique thermodynamic combination of materials that best ensure temperature excursions do not occur. By providing graphical details associated with the package configuration to a user in this way, a user may easily view the required materials and determine how to assemble a particular package configuration for shipment.

Figure 6:
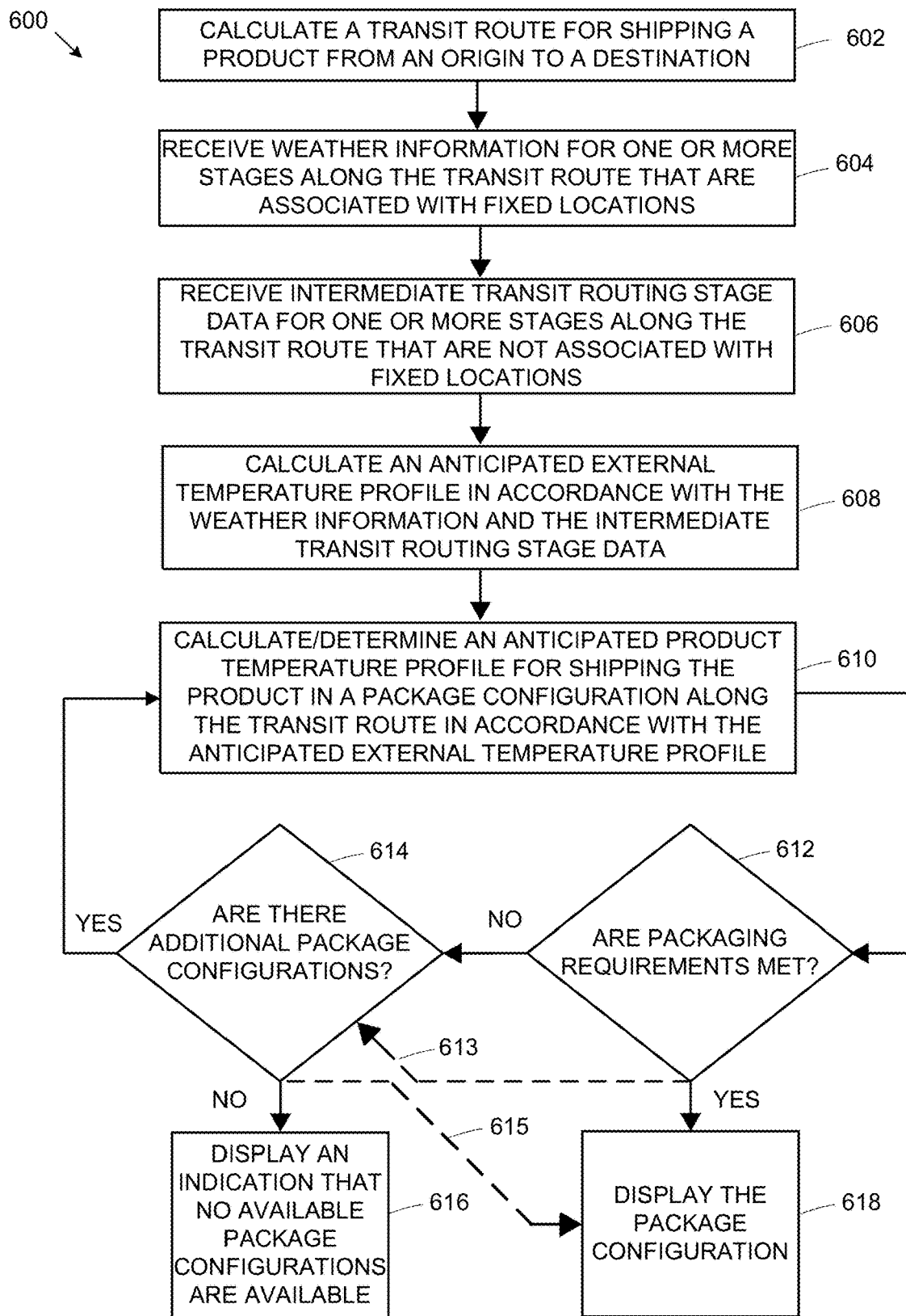
FIG. 6 illustrates a method flow 600, according to an embodiment.

FIG. 6 illustrates a method flow 600, according to an embodiment. In an embodiment, one or more portions of method 600 (or the entire method 600) may be implemented by any suitable device, and one or more portions of method 600 may be performed by more than one suitable device in combination with one another. For example, one or more portions of method 600 may be performed by one or more front-end components implemented as part of front end 102 and/or one or more back-end components implemented as part of back end 104, as shown in FIG. 1. In an embodiment, method 600 may be performed by any suitable combination of one or more processors, applications, algorithms, and/or routines. For example, method 600 may be performed via processing unit 202 executing instructions stored in package selection application 208 in conjunction with order information received via communication unit 204.

Method 600 may start when one or more processors calculate a transit route for shipping a product from an origin to a destination (block 602). This may include, for example, selecting the most probable transit route to be used for a current shipment based upon similar previous shipments (e.g., those with the same courier, shipping option, destination, and/or time of year) (block 602).

Method 600 may include one or more processors receiving weather information for one or more stages along the calculated transit route (block 602), which may correspond to stages having fixed locations (block 604). For example, the weather information may correspond to the locations (e.g., zip codes) of the origin, destination, shipping hubs, and/or distribution centers along the transit route for a particular carrier (block 604). Again, this weather information may be updated in accordance with any suitable schedule, such as continuously, once a day, three times a day, etc. In various embodiments, the weather information may be received via publicly available or other data sources, or first stored in a database and then accessed locally as needed (block 604).

Method 600 may include one or more processors receiving intermediate transit routing stage data for one or more stages along the calculated transit route (block 606). The intermediate transit routing stage may include information that corresponds, for example, to intermediate transit stages that are not associated with fixed locations (block 606). As discussed above, intermediate transit stages may include stages along the transit route (block 602) in which the package is anticipated to be on a plane or truck in transit between shipping hubs, distribution centers, the destination, etc.

In various embodiments, the intermediate transit routing stage data may include information from previous similar shipments that has been tracked, measured, and/or stored, such as the historical log data and/or calibrated shipping measurement data, as discussed above (block 606). The intermediate transit routing stage data may indicate, or be used to calculate indications of, for example, typical temperatures at each of the intermediate transit stages as well as the typical durations that the package is expected to be at each intermediate transit stage (block 606). In various embodiments, the intermediate transit routing stage data may be received via publicly available data sources or other suitable data sources, or first stored in a database and then accessed locally as needed (block 606).

Method 600 may include one or more processors calculating an anticipated external temperature profile in accordance with the weather information and intermediate transit routing stage data (block 608). This may include, for example, calculating the anticipated external temperature profile in accordance with the techniques discussed above with respect to FIG. 3B and elsewhere herein (block 608). For example, method 600 may include using the expected temperature at each stage in the transit route and the expected duration that the package is expected to be at each stage to determine an overall temperature profile during shipping along the transit route (block 608).

Method 600 may include one or more processors calculating an anticipated product temperature profile for shipping the product in a package configuration along the transit route in accordance with the anticipated external temperature profile (block 610). This may include, for example, performing a thermodynamic analysis of a package configuration in accordance with the anticipated external temperature profile, as discussed above with respect to FIG. 4 and elsewhere herein (block 610). Thus, in an embodiment, the anticipated product temperature profile represents calculated fluctuations in the temperature of the product as a result of shipping the product in that particular package configuration along the transit route as it is exposed to temperature fluctuations in accordance with the anticipated external temperature profile (block 610). In some embodiments, the calculation of an anticipated product temperature profile may be done in advance, i.e., prior to a package being shipped (block 610). In such a case, method 600 may include determining the anticipated product temperature profile (block 610) instead of calculating the anticipated product temperature profile "on the fly" or as a package is being shipped. For example, when anticipated product temperature profiles are calculated in advance, method 600 may include one or more processors retrieving, accessing (e.g., via a database or other storage device, as discussed above with reference to FIG. 1), or otherwise determining the anticipated product temperature profile for a particular package configuration (block 610).

Method 600 may include one or more processors determining a package configuration that meets any suitable number and/or type of conditions (block 612). For instance, method 600 may include one or more processors selecting a package configuration that is associated with a threshold probability of the product's temperature not deviating outside of a temperature range when shipped via a particular transit route (block 612). This may also include, for example, selecting a package configuration that meets other predetermined requirements and/or conditions such as, for example, a specified maximum package configuration cost, a maximum shipping cost, a maximum package configuration weight, a requirement that "green" or eco-friendly shipping materials be used, etc. These predetermined requirements and/or conditions may be tailored based on a user's preferences such that particular shipments, destinations, clients, products, modes of shipment, etc., are assigned particular predetermined requirements and/or conditions. Alternatively, a shipper may specify the same predetermined requirements and/or conditions for all shipments.

Method 600 may also include determining that packaging requirements are met by verifying that a particular package configuration also passes the temperature excursion test discussed herein (block 612). This may include, for example, additionally or alternatively performing an additional thermodynamic analysis to "walk" the packaging configuration sequentially though each transit stage of the calculated anticipated external temperature profile (block 608). As part of this verification process, it may be determined whether, at any of the sequential transit stages (e.g., stage 1, stage 1+2, stage 1+2+3, etc.), shipping the packaging configuration along the transit route (block 602) would result in a temperature excursion (block 612).

In any event, once the packaging requirements are met, method 600 may include one or more processors displaying one or more package configurations (block 618) that were identified as meeting the packaging requirements (block 612). In some embodiment, the first package configuration found to meet the packaging requirements may be displayed to the user (block 618). But in other embodiments, several packaging configurations may meet the packaging requirements, and each is eventually displayed to the user (block 618).

In embodiments in which more than one package configuration is displayed, method 600 may alternately proceed along line 613 to determine whether additional package configurations are available, as discussed above with respect to the determination that packaging requirement are not met (block 612). In such a case, method 600 may include determining whether additional package configurations are available (block 614), which may include the determination of whether a specified maximum number of packaging configurations have met the packaging requirements, (e.g., 2, 3, 4, all package configurations in the queue, etc.). Once it is determined that no more package configurations are available (block 614), then method 60 may proceed along line 615 to display each package configuration that meets the packaging requirements (block 618).

In any event, displaying the package configuration(s) may include, for example, displaying the packaging configuration as shown in the example illustration 500, which may be displayed to a user, as previously shown and discussed with reference to FIG. 5 (block 618). This may also include, for example, displaying several package configuration options, with each package configuration from among the displayed options meeting the packaging requirements (block 618). However, if the packaging configuration requirements are not met, then method 600 may continue to analyze other packaging configurations (block 614).

Method 600 may include one or more processors determining whether additional package configurations are available (block 614). For example, a shipper may have a queue of package configurations that have passed a temperature excursion test, as discussed above with reference to FIG. 4. Continuing this example, the order in which the queue of package configurations is selected may be established for particular shipment types or for particular clients, destinations, modes of shipment, etc. (block 614). Again, the order in which each package configuration is analyzed may be any suitable ranking system such as, for example, the from the lowest to highest probability in which each anticipated product temperature profile will result in a temperature excursion, from the lowest to highest cost, etc.

Thus, as each package configuration is analyzed to determine whether it meets the packaging requirements (block 612), method 600 may eliminate each package configuration in the queue for the current shipment, and analyze the next packaging configuration. Furthermore, method 600 may include determining whether a specified maximum number of packaging configurations have met the packaging requirements, as discussed above (block 614).

When additional package configurations are available, method 600 may include one or more processors calculating (or determining) additional anticipated product temperature profiles (block 610) in the predetermined queue order, as discussed herein. Alternatively, if anticipated product temperature profiles have already been calculated for each package in the queue of package configurations, and none of them meet the packaging requirements, then method 600 may display an indication accordingly (block 616). Method 600 may display this indication (block 616), for example, via the same computing device used to display the packaging configuration (block 618). At this point, the user may seek out a manager or other supervisor to make a determination regarding how to ship the package, which may include, for example, overriding one or more of the packaging requirements (block 612). Again, in embodiments in which one or more package configurations meeting the packaging requirements are to be displayed to the user, then method 600 may instead follow path 615 to display each of these package configurations (block 618).

Technical Advantages

The embodiments described herein may be implemented as part of one or more computer components such as those implemented as part of a front-end or a back end. Furthermore, the embodiments described herein may be implemented as part of a computer network architecture to facilitate communications between various other devices and/or components. For example, order information may be received on a back-end, a package configuration may be calculated on the back-end, and this information sent to one or more front-end components where it may be viewed. As part of this process, thermodynamic calculations are performed on various package configurations to predict the best option given a particular external temperature profile along a transit route. Therefore, the embodiments described herein address and solve issues of a technical nature that are necessarily rooted in computer technology.

Furthermore, the embodiments described herein include obtaining and updating data over time that is used as part of the various calculations to select a particular package configuration. Therefore, as additional data is obtained over time (e.g., weather information and intermediate transit routing stage data) the data used as part of these calculations may be refined to improve the overall accuracy and efficiency of the process. Without the improvements suggested herein directed to accessing, storing, and updating this data, calculations of the anticipated external temperature profile described herein could not be performed, nor could a thermodynamic calculation be attempted due to a lack of incomplete or inaccurate data.

Finally, due to the nature of the embodiments described herein, the use of data associated with the various stages of a transit route, which may be updated over time, improves the speed, efficiency, and accuracy in which the calculations associated with the selection of an appropriate package configuration may be performed. Due to these improvements, the aspects address computer-related issues regarding efficiency over the traditional techniques used to perform thermodynamic calculations. Thus, the embodiments described herein also address computer-related issues that are related to efficiency metrics, such as consuming less power, for example.

Additional Considerations

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A computer-implemented method, comprising:
identifying a transit route associated with shipping a product from an origin to a destination;
identifying an anticipated external temperature profile associated with the transit route;
automatically selecting, from a plurality of packages including first and second packages, a particular package for shipping the product, wherein said automatically selecting includes:
(i) performing a first thermodynamic analysis of the first package to calculate a first anticipated product temperature profile for shipping the product in the first package along the transit route in accordance with the anticipated external temperature profile;
(ii) performing a second thermodynamic analysis of the second package to calculate a second anticipated product temperature profile for shipping the product in the second package along the transit route in accordance with the anticipated external temperature profile;
(iii) calculating, based on the first and second anticipated product temperature profiles, (a) a first probability that the first package will conform to a desired temperature range for the product when shipping the product along the transit route, and (b) a second probability that the second package will conform to the desired temperature range for the product;
(iv) ranking the first and second anticipated product temperature profiles based on a set of factors including the first and second probabilities that the first and second packages will conform to the desired temperature range for the product when shipping the product along the transit route; and
(v) automatically selecting the first package or the second package as the particular package based on which of the first and second anticipated product temperature profiles is ranked as better conforming to the desired temperature range in light of the anticipated external temperature profile when shipping the product along the transit route.

2. The method of claim 1, wherein the set of factors is a first set of factors and wherein ranking the first and second packages further comprises:
ranking the first and second anticipated product temperature profiles based on both: (i) the first set of factors, and (ii) a second set of factors relating to shipping preferences.

3. The method of claim 2, wherein the second set of factors includes a shipping cost.

4. The method of claim 3, wherein ranking the first and second anticipated product temperature profiles comprises:
ranking the first and second anticipated product temperature profiles such that the best ranked anticipated product temperature profile is the one that: (i) does not deviate outside the desired temperature range; and (ii) is associated with the package having the lowest shipping cost.

5. The method of claim 1, wherein ranking the first and second anticipated product temperature profiles comprises:
ranking the first and second anticipated product temperature profiles such that the best ranked one is the anticipated product temperature profile that has the greatest total margin between temperatures and limits of the desired temperature range, wherein the total margin accounts for: (i) margins between temperature peaks and an upper temperature limit of the desired temperature range, and (ii) margins between temperature troughs and a lower temperature limit of the desired temperature range, such that the selected particular package provides the highest probability among the plurality of packages of the product's temperature not deviating outside of the desired temperature range.

6. The method of claim 1, wherein the transit route is a first transit route from a plurality of transit routes including the first transit route and a second transit route;
wherein the method further comprises: identifying a second anticipated external temperature profile associated with the second route;
wherein automatically selecting the particular package further includes:
(i) performing a third thermodynamic analysis of the first package to calculate a third anticipated product temperature profile for shipping the product in the first package along the second transit route in accordance with the second anticipated external temperature profile;
(ii) performing a fourth thermodynamic analysis of the second package to calculate a fourth anticipated product temperature profile for shipping the product in the second package along the second transit route in accordance with the second anticipated external temperature profile;
(iii) calculating, based on the third and fourth anticipated product temperature profiles, (a) a third probability that the first package will conform to a desired temperature range for the product when shipping the product along the second transit route, and (b) a fourth probability that the second package will conform to the desired temperature range for the product when shipping the product along the second transit route;
(iii) ranking the first, second, third, and fourth anticipated product temperature profiles based on a set of factors including the probabilities that the first and second packages will conform to the desired temperature range for the product when shipping the product along the first and second transit routes; and
(iv) automatically selecting both a transit route and a package based on which of the first, second, third, and fourth anticipated product temperature profiles is ranked as best conforming to the desired temperature range in light of the anticipated external temperature profiles when shipping the product.

7. The method of claim 1, wherein identifying the anticipated external temperature profile associated with the transit route comprises:
identifying a plurality of stages of the transit route;
calculating an anticipated duration of time for each of the plurality of stages based on a historical log of durations of time in which packages shipped along the transit route were within each stage; and
calculating the anticipated external temperature profile based on: (i) weather information for each stage, and (ii) the anticipated duration of time for each stage.

8. The method of claim 1, wherein the server is configured to identify the anticipated external temperature profile associated with the transit route by implementing one or more instructions to:
identify a plurality of stages of the transit route;
calculate an anticipated duration of time for each of the plurality of stages based on a historical log of durations of time in which packages shipped along the transit route were within each stage; and
calculate the anticipated external temperature profile based on: (i) weather information for each stage, and (ii) the anticipated duration of time for each stage.

9. A server comprising:
a memory storing: (i) data representing a transit route associated with shipping a product from an origin to a destination, and (ii) an anticipated external temperature profile associated with the transit route; and
a processor communicatively coupled to the memory and configured to execute one or more instructions that cause the processor to automatically select, from a plurality of packages including first and second packages, a particular package for shipping the product, wherein executing the one or more instructions cause the processor to:
(i) perform a first thermodynamic analysis of the first package to calculate a first anticipated product temperature profile for shipping the product in the first package along the transit route in accordance with the anticipated external temperature profile;
(ii) perform a second thermodynamic analysis of the second package to calculate a second anticipated product temperature profile for shipping the product in the second package along the transit route in accordance with the anticipated external temperature profile;
(iii) calculate, based on the first and second anticipated product temperature profiles, (a) a first probability that the first package will conform to a desired temperature range for the product when shipping the product along the transit route, and (b) a second probability that the second package will conform to the desired temperature range for the product;
(iv) rank the first and second anticipated product temperature profiles based on a set of factors including the first and second probabilities that the first and second packages will conform to the desired temperature range for the product when shipping the product along the transit route; and
(v) automatically select the first package or the second package as the particular package based on which of the first and second anticipated product temperature profiles is ranked as better conforming to the desired temperature range in light of the anticipated external temperature profile when shipping the product along the transit route.

10. The server of claim 9, wherein the set of factors is a first set of factors and wherein causing the processor to rank the first and second packages comprises:
causing the processor to rank the first and second anticipated product temperature profiles based on both: (i) the first set of factors, and (ii) a second set of factors relating to shipping preferences.

11. The server of claim 10, wherein the second set of factors includes a shipping cost.

12. The server of claim 11, wherein causing the processor to rank the first and second anticipated product temperature profiles comprises:
causing the processor to rank the first and second anticipated product temperature profiles such that the best ranked anticipated product temperature profile is the one that: (i) does not deviate outside the desired temperature range; and (ii) is associated with the package having the lowest shipping cost.

13. The server of claim 9, wherein causing the processor to rank the first and second anticipated product temperature profiles comprises:
causing the processor to rank the first and second anticipated product temperature profiles such that the best ranked one is the anticipated product temperature profile that has the greatest total margin between anticipated temperatures and temperature limits for the temperature range, wherein the total margin accounts for: (i) margins between temperature peaks and an upper temperature limit of the desired temperature range, and (ii) margins between temperature troughs and a lower temperature limit of the desired temperature range, such that the selected particular package provides the highest probability among the plurality of packages of the product's temperature not deviating outside of the desired temperature range.

14. The server of claim 9, wherein the transit route is a first transit route from a plurality of transit routes including the first transit route and a second transit route;
wherein the anticipated external temperature profile is a first anticipated external temperature profile;
wherein the one or more instructions further cause the processor to:
(i) identify a second anticipated external temperature profile associated with the second route;
(ii) perform a third thermodynamic analysis of the first package to calculate a third anticipated product temperature profile for shipping the product in the first package along the second transit route in accordance with the second anticipated external temperature profile;
(iii) perform a fourth thermodynamic analysis of the second package to calculate a fourth anticipated product temperature profile for shipping the product in the second package along the second transit route in accordance with the second anticipated external temperature profile;
(iv) calculate, based on the third and fourth anticipated product temperature profiles, (a) a third probability that the first package will conform to a desired temperature range for the product when shipping the product along the second transit route, and (b) a fourth probability that the second package will conform to the desired temperature range for the product when shipping the product along the second transit route;
(v) rank the first, second, third, and fourth anticipated product temperature profiles based on a set of factors including the probabilities that the first and second packages will conform to the desired temperature range for the product when shipping the product along the first and second transit routes; and
(vi) automatically select both a transit route and a package based on which of the first, second, third, and fourth anticipated product temperature profiles is ranked as best conforming to the desired temperature range in light of the anticipated external temperature profiles when shipping the product.

15. The server of claim 9, wherein causing the processor to identify the anticipated external temperature profile associated with the transit route comprises causing the processor to:
identify a plurality of stages of the transit route;
calculate an anticipated duration of time for each of the plurality of stages based on a historical log of durations of time in which packages shipped along the transit route were within each stage; and
calculate the anticipated external temperature profile based on: (i) weather information for each stage, and (ii) the anticipated duration of time for each stage.

16. A system for determining a packaging option for shipping a product from an origin to a destination, comprising:
(1) a server configured to:
(A) identify a transit route associated with shipping a product from an origin to a destination;
(B) identify an anticipated external temperature profile associated with the transit route;
(C) automatically select, from a plurality of packages including first and second packages, a particular package for shipping the product, by implementing operations to:
(i) perform a first thermodynamic analysis of the first package to calculate a first anticipated product temperature profile for shipping the product in the first package along the transit route in accordance with the anticipated external temperature profile;
(ii) perform a second thermodynamic analysis of the second package to calculate a second anticipated product temperature profile for shipping the product in the second package along the transit route in accordance with the anticipated external temperature profile;

(iii) calculate, based on the first and second anticipated product temperature profiles, (a) a first probability that the first package will conform to a desired temperature range for the product when shipping the product along the transit route, and (b) a second probability that the second package will conform to the desired temperature range for the product;

(iv) rank the first and second anticipated product temperature profiles based on a set of factors including the first and second probabilities that the first and second packages will conform to the desired temperature range for the product when shipping the product along the transit route; and (v) automatically select the first package or the second package as the particular package based on which of the first and second anticipated product temperature profiles is ranked as better conforming to the desired temperature range in light of the anticipated external temperature profile when shipping the product along the transit route; and (2) a client device configured to receive the data indicative of the selected particular package and to display a configuration associated with the selected package that includes a respective combination of package size, package materials, phase change materials, and dunnage for the selected particular package.

17. The system of claim 16, wherein the set of factors is a first set of factors and wherein the server is configured to rank the first and second packages by: ranking the first and second anticipated product temperature profiles based on both: (i) the first set of factors, and (ii) a second set of factors relating to shipping preferences.

18. The system of claim 17, wherein the second set of factors includes a shipping cost.

19. The system of claim 18, wherein the server is configured to rank the first and second anticipated product temperature profiles by: ranking the first and second anticipated product temperature profiles such that the best ranked anticipated product temperature profile is the one that: (i) does not deviate outside the desired temperature range; and (ii) is associated with the package having the lowest shipping cost.

20. The system of claim 16, wherein the server is configured to rank the first and second anticipated product temperature profiles by implementing one or more instructions to:

rank the first and second anticipated product temperature profiles such that the best ranked one is the anticipated product temperature profile that has the greatest total margin between temperatures and limits of the desired temperature range, wherein the total margin accounts for: (i) margins between temperature peaks and an upper temperature limit of the desired temperature range, and (ii) margins between temperature troughs and a lower temperature limit of the desired temperature range, such that the selected particular package provides the highest probability among the plurality of packages of the product's temperature not deviating outside of the desired temperature range.

* * * * *